United States Patent
Guennec et al.

(10) Patent No.: US 10,045,301 B2
(45) Date of Patent: Aug. 7, 2018

(54) METHOD FOR MANAGING RESOURCES ON A TERMINAL

(71) Applicant: ORANGE, Paris (FR)

(72) Inventors: Hervé Guennec, Lannion (FR); Nadia Mer, Tregastel (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/385,657

(22) Filed: Dec. 20, 2016

(65) Prior Publication Data

US 2017/0181095 A1 Jun. 22, 2017

(30) Foreign Application Priority Data

Dec. 21, 2015 (FR) ..................................... 15 62984

(51) Int. Cl.
| | |
|---|---|
| *H04M 1/00* | (2006.01) |
| *H04N 13/02* | (2006.01) |
| *H04W 52/02* | (2009.01) |
| *H04M 1/02* | (2006.01) |
| *H04N 7/15* | (2006.01) |

(Continued)

(52) U.S. Cl.
CPC ...... *H04W 52/0254* (2013.01); *G06F 1/1684* (2013.01); *G06F 1/1686* (2013.01); *G06F 1/325* (2013.01); *G06F 1/3212* (2013.01); *G06F 9/5011* (2013.01); *G06F 9/5022* (2013.01); *H04M 1/0264* (2013.01); *H04N 7/142* (2013.01); *H04N 7/15* (2013.01); *H04N 21/4223* (2013.01); *H04N 21/4436* (2013.01); *H04N 21/440263* (2013.01); *H04N 21/440281* (2013.01); *H04W 52/0274* (2013.01); *Y02D 70/00* (2018.01); *Y02D 70/1222* (2018.01);

(Continued)

(58) Field of Classification Search
CPC .................................................. H04N 13/0239
USPC ........................... 348/46–48; 455/556.1, 557
See application file for complete search history.

(56) References Cited

U.S. PATENT DOCUMENTS

| 9,565,416 B1 * | 2/2017 | Lewkow ............ H04N 5/23212 |
| 2012/0140038 A1 * | 6/2012 | Bi ...................... H04N 13/0022 348/46 |

(Continued)

FOREIGN PATENT DOCUMENTS

WO    WO 2014/138331 A2    9/2014

OTHER PUBLICATIONS

French Search Report dated Sep. 7, 2016, issued in French Application No. 1562984, 7 pages.

(Continued)

*Primary Examiner* — Simon Nguyen
(74) *Attorney, Agent, or Firm* — Knobbe, Martens, Olson & Bear, LLP

(57) ABSTRACT

A method for managing resources during the capture of at least one data stream on a terminal is disclosed. The terminal can comprise at least one first acquisition device for acquiring a data stream and a second acquisition device alternative to the first acquisition device, the first and second acquisition devices being suitable for capturing one and the same type of data. The method is noteworthy in that it comprises steps of obtaining of an indication according to which a limit of resources is reached, of identification of the acquisition devices currently in use, and of implementation of a resources-saving measure associated with the first acquisition device, when the first device is identified as currently in use.

11 Claims, 3 Drawing Sheets

(51) Int. Cl.
  *H04N 21/4402* (2011.01)
  *G06F 1/32* (2006.01)
  *G06F 9/50* (2006.01)
  *G06F 1/16* (2006.01)
  *H04N 7/14* (2006.01)
  *H04N 21/4223* (2011.01)
  *H04N 21/443* (2011.01)

(52) U.S. Cl.
  CPC .......... *Y02D 70/142* (2018.01); *Y02D 70/144* (2018.01); *Y02D 70/164* (2018.01)

(56) References Cited

U.S. PATENT DOCUMENTS

| | | | |
|---|---|---|---|
| 2013/0147923 A1* | 6/2013 | Zhou | H04B 3/20 |
| | | | 348/47 |
| 2014/0139639 A1 | 5/2014 | Wagner et al. | |
| 2015/0163400 A1* | 6/2015 | Geiss | H04N 5/23229 |
| | | | 348/231.99 |
| 2015/0205749 A1 | 7/2015 | Whitby-Strevens et al. | |

OTHER PUBLICATIONS

French Search Report and Written Opinion issued in French Registration No. FR1562984 filed Dec. 21, 2015, 4 pages.

\* cited by examiner

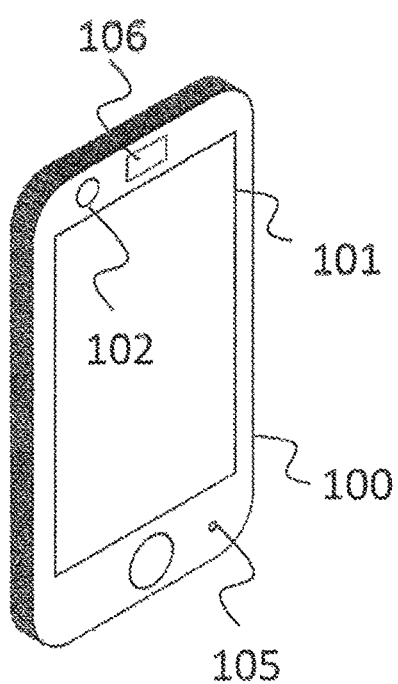
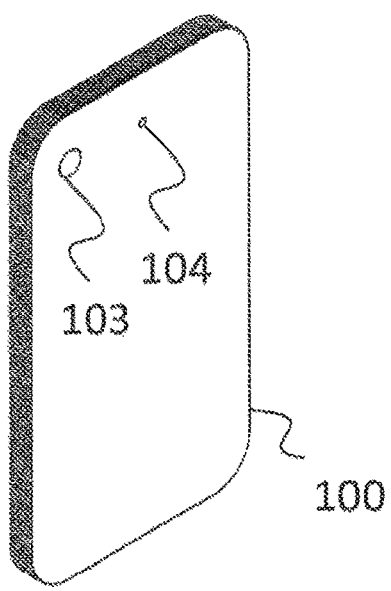
Fig. 1a
Fig. 1b

METHOD FOR MANAGING RESOURCES ON A TERMINAL

TECHNICAL FIELD

The field relates to the field of mobile terminals and in particular to the field of the management of resources on a mobile terminal.

BACKGROUND

Communication technologies have experienced very rapid evolution over recent years. Connected mobile terminals in particular, such as for example intelligent telephones, so-called smartphones, have become democratized and today occupy a central place in the life of their users. Users are contactable at any time according to various modalities and share all sorts of information with others, where and when they so desire.

These terminals make it possible for example to establish voice communications, to exchange files, instant messages or emails, or else to establish video communications. Smartphones often comprise various types of sensors, such as for example proximity or light sensors, or else a locating module of global positioning system (GPS) type. Numerous terminals also integrate a dual-camera, one being positioned on the front face of the terminal so as to capture the user's face and the other being situated on the opposite face in order to capture images of the environment of the terminal. Likewise, certain terminals integrate an ambience microphone intended to capture the sound of the environment and a second microphone intended to capture the voice of the user when the latter is communicating. In association with these capture devices, the terminals also comprise real-time audio and video encoding and decoding components, as well as various types of wireless network interfaces, such as for example Wifi, Bluetooth or 3G interfaces.

Such an accumulation of functionalities in a compact and roaming device poses a resources management problem. Thus, very rigorous energy management is indispensable in order that users may enjoy satisfactory autonomy.

Audiovisual communications like videoconferencing are particularly heavy consumers of resources. Indeed, this mode of communication utilizes the simultaneous implementation of a video encoder and of a video decoder, of a camera and of a screen, of an audio encoder and of an audio decoder, of an amplifier, of a loudspeaker and of a microphone.

Various solutions have been proposed for optimizing energy consumption under these conditions. For example, international patent application WO 2014138331 A2 describes a method making it possible to adapt the quality of a decoded video according to the residual charge of the battery of a terminal. Methods for adapting the quality of a video according to the network resources available are also known.

However, these adaptation techniques are based solely on the available resources and do not take into account the context of use of the terminal. It may thus happen that the quality of a video stream and/or of an audio stream is decreased at a time which is not opportune for the user.

A need therefore exists to adapt the consumption of resources during a communication as a function of the context in which the terminal is used.

The embodiments disclosed herein improve the consumption of resources based on contexts in which the terminal is used.

SUMMARY

For this purpose, the disclosed embodiments relate to a method for managing resources during the capture of at least one data stream on a terminal, the terminal comprising at least one first acquisition device for acquiring a data stream and a second acquisition device alternative to the first acquisition device, the first and second acquisition devices being suitable for capturing one and the same type of data, the method being such that it comprises the following steps:
  Obtaining of an indication according to which a limit of resources is reached,
  Identification of the acquisition devices currently in use,
  Implementation of a resources-saving measure associated with the first acquisition device, when the first device is identified as currently in use.

The identification of an acquisition device currently in use makes it possible to determine a context of use. For example, it is possible to determine a context of use depending on whether the acquisition device is a camera situated at the back of the terminal or a camera situated on the front face of the terminal. Likewise, it is possible to determine a context of use depending on whether the acquisition device is an ambience microphone or a microphone configured to capture the voice of the user.

Thus, when a limit of resources is reached, the method proposes to implement at least one resources-saving measure suited to the context of use determined with the help of the acquisition devices currently in use.

The method can thus determine a context of use of the terminal according to the capture device which is currently in use, so as to take energy-saving measures suited to this context.

The resources-saving measure implemented is associated with the first device. Thus, it does not affect the stream arising from the second device.

According to a particular embodiment, the method is such that the resources-saving measure associated with the first acquisition device is implemented when the first and second acquisition devices are identified as currently in use.

When the first and second acquisition devices are used simultaneously, for example with the aim of composing and transmitting a video stream comprising images of the environment of the terminal, the said images being inlaid with images of the user, the method proposes to implement a resources-saving measure associated with the first acquisition device. Thus, a resource-saving measure can be implemented for the inlaid image without the image in which it is inlaid being affected by such a measure.

Method according to any one of the preceding embodiments, characterized in that the first acquisition device is an audio capture device intended to capture a sound of the environment of the terminal.

Method according to any one of the preceding embodiments, characterized in that the first acquisition device is a video capture device intended to capture images of the user of the terminal.

According to a particular embodiment, the method is such that the resources-saving measure comprises the suspension of capture by the first device.

Capture from the first device is halted when the latter is determined as currently in operation. The fact that the first capture device is currently in operation gives an indication about a probable context of use of the terminal by its user. It is thus possible to halt the capture in order to release resources according to the context of use of the terminal. Such a provision allows savings to be made in terms of electrical consumption and network bandwidth.

According to a particular embodiment, the method is such that the first and second acquisition devices are located on different faces of the terminal.

The fact that the first and second acquisition devices are located on different faces of the terminal allows the determination of a context of use of the terminal according to the device currently in operation. In particular, it is possible to distinguish the use that the user makes of their terminal depending on whether an acquisition device is active on the front face or on the rear face of the terminal. When an acquisition device is active on the rear face of the terminal, it is possible to deduce therefrom that the captured data relate to the user's environment. Conversely, when an acquisition device is active on the front face of the terminal, it may be deduced that the captured data relate to the user.

Thus, a context of use can be determined depending on whether an acquisition device situated on the front face of the terminal or on the rear face of the terminal is currently in use.

According to a particular embodiment, the method is such that the data stream is a video stream.

The first and second acquisition devices are video sensors, such as for example cameras suitable for capturing a video stream. It is then possible to determine the context of use of the terminal according to the camera currently in use. For example, if a camera situated at the back of the terminal is active, the method can determine that the user is capturing a video sequence representative of the environment of the terminal. Conversely, if a camera situated on the front face of the terminal, for example on the face of the terminal comprising a screen, the method can determine that the user is capturing an image of himself or herself. In a conventional manner, when a video communication of videoconferencing type is established with an opposite party, a first camera situated on the front face of the terminal (frontal camera) is activated by default, in such a way that the opposite parties can see one another and speak to one another. When a user explicitly selects a second camera of the terminal so as to send an alternative video stream to an opposite party, this is generally because they wish to share an object of the environment that they consider to be more important to show than their own face. For example, a user can select a second dorsal camera instead of the first frontal camera of their terminal in order to transmit to an opposite party a video stream representative of a document that they wish to share. In such a case, the method proposes to identify the cameras currently in use and to implement a resources-saving measure only if the first frontal camera is currently in use. Thus, the method makes it possible to safeguard the video stream arising from the second camera when a limit of resources is reached, and to implement a resources-saving measure when conversely, it is the first camera which is being used.

In this manner, the method makes it possible to adapt the implementation of resources-saving measures according to the context of use of the terminal, the context of use being determined by identifying the cameras currently in use on the terminal.

According to a particular embodiment, the method is such that the resources-saving measure comprises the repeating of the last image captured by the first device.

When a limit of resources is reached and the acquisition device identified is the first camera, for example a frontal camera intended to capture images of the user in the course of a videoconference with an opposite party, the method suspends the capture of new images by the first camera and brings about the repetition of the last captured image. Thus, the resources used by the camera can be released. Moreover, the video coding of a still image being much less complex than the coding of a sequence of different images, the method furthermore helps to reduce the consumption of the network resources when sending the video stream to an opposite party. Thus, the method makes it possible to reduce the resources used when the first camera is identified as currently in use while continuing to send an image of the user to the opposite party.

According to a particular embodiment, the method is such that the resources-saving measure comprises the reducing of the frequency of capture of the images by the first device.

By reducing the image capture frequency, the method makes it possible to reduce the complexity of the processing to be carried out for encoding the video stream. Thus, such a resources-saving measure makes it possible to release calculation time, to slow down the discharging of the battery and to reduce the amount of data dispatched over the network in order to transmit the stream to an opposite party.

According to a particular embodiment, the method is such that the energy-saving measure comprises the reducing of the spatial resolution of the images captured by the first device.

By reducing the spatial resolution of the captured images, the method makes it possible to reduce the complexity of the processing to be carried out for encoding the video stream. Thus, such a resources-saving measure makes it possible to release calculation time, to slow down the discharging of the battery and to reduce the amount of data dispatched over the network in order to transmit the stream to an opposite party.

According to a particular embodiment, the method is such that the resources-saving measure comprises the dispatching to the opposite party of the last image captured by the first video acquisition device and the stopping of the capture from the first device.

In this manner, the opposite party has the last image captured by the terminal and can display this image instead of the video stream.

According to a particular embodiment, the method is such that the data stream is an audio stream.

The data stream is an audio stream captured by a first and/or a second audio acquisition device of the terminal. In a conventional manner, certain terminals comprise at least two microphones. A first microphone is intended to capture an ambience sound, representative of the environment of the terminal. A second microphone is intended to capture the user's speech when they are communicating. These microphones can be distributed on different faces of the terminal. It is thus possible to determine a context of use of the terminal according to the microphone used for capture. The identification of the audio acquisition device currently in use allows the method to implement a resources-saving measure suited to the context of use of the terminal. For example, when the first audio acquisition device is identified as currently in operation, that is to say when the microphone intended to capture the sound ambience of the environment of the terminal is activated, the method can implement a resources-saving measure. For example, the sound ambience generally being of lesser importance, the terminal can in this case halt the audio capture, or else change the audio stream encoding format for a format that consumes less calculation time or consumes less bandwidth. Conversely, when the second audio acquisition device, that is to say the microphone intended to capture the user's speech, is identified as currently in use, the method proposes to safeguard the audio stream since the user's speech is generally of high importance during an audiovisual communication.

According to another aspect, the disclosed embodiments relate to a device for managing resources during the capture of at least one data stream on a terminal, the device comprising at least one first acquisition device for acquiring a data stream and a second acquisition device alternative to the first acquisition device, the first and second acquisition devices being suitable for capturing one and the same type of data, the device being characterized in that it comprises:
 An analysis module suitable for obtaining an indication according to which a limit of resources is reached,
 A module for identifying the acquisition devices currently in use, and
 A control module configured to implement a resources-saving measure associated with the first acquisition device, when the first device is identified as currently in use.

According to a particular embodiment, the device is such that the first and second acquisition devices are located on different faces of the device.

The disclosed embodiments further pertain to a terminal comprising a management device such as described hereinabove.

The device and the terminal exhibit advantages analogous to those of the method presented above.

In a particular embodiment, the various steps of the method are determined by computer program instructions.

Consequently, the disclosed embodiments also envisage a computer program comprising instructions suited to the implementation of the steps of a method such as described hereinabove, when the program is executed by a processor.

This program can use any programming language, and be in the form of source code, object code, or of code intermediate between source code and object code, such as in a partially compiled form, or in any other desirable form.

The disclosed embodiments also envisage a recording medium readable by a processor on which is recorded a computer program comprising instructions for executing the steps of the method.

The information medium can comprise any entity or device capable of storing the program. For example, the medium can comprise a storage means, such as a ROM, for example a CD ROM or a microelectronic circuit ROM, a flash memory, or else a magnetic recording means, for example a diskette (floppy disk) or a hard disk.

Moreover, the information medium can be a transmissible medium such as an electrical or optical signal, which can be conveyed via an electrical or optical cable, by radio or by other means. The program according to the disclosed embodiments can be in particular downloaded from a network of Internet type.

Alternatively, the information medium can be an integrated circuit in which the program is incorporated, the circuit being suitable for executing or for being used in the execution of the method in question.

The various aforementioned embodiments or features can be added independently or in combination with one another, to the steps of the management method.

BRIEF DESCRIPTION OF THE DRAWINGS

Other characteristics and advantages will become apparent on reading preferred embodiments described with reference to the figures among which:

FIGS. 1a and 1b illustrate various views of a terminal suitable for implementing the methods according to various embodiments.

DETAILED DESCRIPTION

Figure 2:
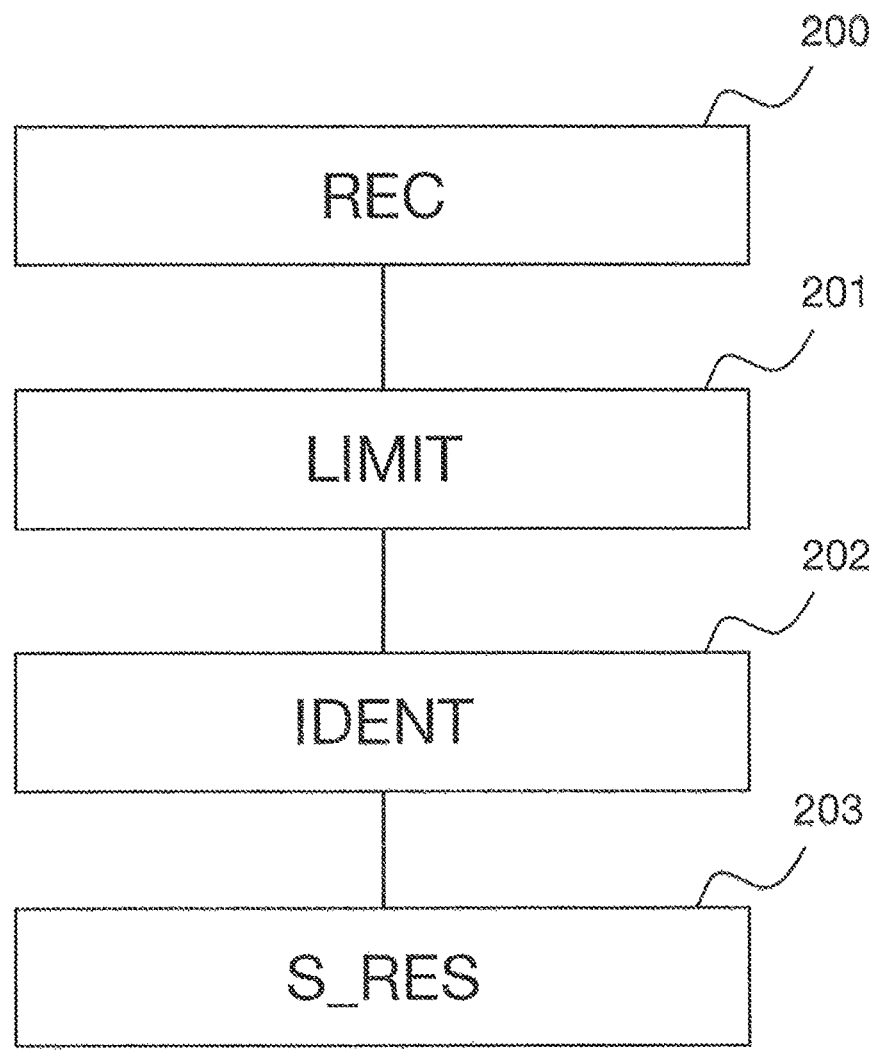
FIG. 2 illustrates the steps of the management method according to a particular embodiment.

FIGS. 1a and 1b illustrate various views of a terminal 100 suitable for implementing the methods disclosed herein, according to various embodiments. The terminal 100 is a mobile terminal (such as a Smartphone) equipped with a screen 101 and with various acquisition devices, such as for example with a first frontal camera 102 intended to capture images of the user when the latter is in audiovisual communication with an opposite party. The screen 101 makes it possible to reproduce the image of the opposite party. A second camera 103, located on the rear face of the terminal, is intended to capture images of the user's environment. The terminal 100 also comprises a first microphone 104 situated on the back of the terminal. This microphone is intended to capture sounds of the environment of the terminal. Finally, the terminal 100 comprises a second microphone 105 intended to capture the user's speech when they are communicating and a loudspeaker 106 that may serve to reproduce a sound signal, and in particular a speech signal received from a remote terminal during a communication. The microphones 104,105 and the cameras 102,103 are configured to capture audio and video data streams that may be encoded in a format suitable for being transmitted to an opposite party during an audiovisual communication such as videoconferencing.

Accordingly, the terminal 100 comprises a processing unit comprising a RAM memory and a processor. Computer program instructions are loaded into the RAM memory from a persistent memory so as to be executed by the processor of the processing unit. These instructions are suitable for carrying out the acquisition of a data stream with the help of at least one microphone and of at least one camera, the encoding of these data according to a suitable format and the transmission of the encoded data to a remote terminal. The computer program also comprises instructions for receiving audio and video data from a communication interface of the terminal, a Wifi network interface for example, decoding these data and reproducing them by way of the loudspeaker 106 and of the screen 101.

The terminal 100 offers a first mode of communication in which the sound and the images transmitted to an opposite party during a communication are captured by the microphone 105 and the camera 102. Such a mode of operation allows the user to transmit their own image and their own voice to the opposite party during an audiovisual communication. A second mode of operation of the terminal 100 implements the camera 103 and the microphone 104 to carry out the capture of the streams sent to the opposite party during a communication. The latter mode of operation advantageously allows a user of the terminal to share an object of the environment with an opposite party. For example, according to this mode of operation, a user can present a document, an object or else share a sound signal of their environment. In a conventional manner, such terminals exhibit a graphical interface suitable for intentionally toggling between the first and the second mode of communication. Thus, a user of the terminal 100 can easily communicate by sharing either their image, or an object of the environment, even both. By way of alternative, the video stream transmitted to the opposite party can be composed from the images captured by the camera 103, the said images being inlaid with images of the user captured by the camera 102, or vice versa. Likewise, the audio stream transmitted to an opposite party may result from a mixing of the audio streams captured simultaneously by the two microphones.

A bidirectional audiovisual communication thus implements numerous components and may turn out to consume a great deal of energy resources and network resources.

FIG. 2 illustrates the steps of the management method, according to a particular embodiment.

According to a first step 200, an audiovisual communication is established with an opposite party. A video stream is then captured with the help of the first camera 102, of the second camera 103 or else with the help of the cameras 102 and 103 simultaneously so as to compose a video comprising both an image of the user and an image of the environment of the user. Likewise, an audio stream is also captured with the help of the first microphone 104, of the second microphone 105 or else simultaneously with the help of the microphones 104 and 105, so as to compose an audio stream resulting from a mixing between the audio streams captured with the help of the microphones 104 and 105. Of course, different variants are possible, it being possible for the transmitted streams to be captured with the help of any one or more acquisition devices of the terminal.

In step 201, an indication according to which a limit of resources is reached is obtained. Such an indication may for example signal the fact that a predetermined discharge threshold of the battery is reached. The indication can be obtained by way of a component for managing the power supply of the terminal when the residual charge of the battery reaches, for example, 10%. Accordingly, the power supply management component transmits, for example, in a regular manner the charge level of the battery to the operating system of the terminal, by using for example a communication bus. The operating system can be configured so as to send a notification destined for other components when the charge reaches a predetermined critical threshold. Thus, according to a particular embodiment, the operating system sends a notification indicating that a residual charge threshold of the battery is reached.

According to another particular embodiment, the indication according to which a limit of resources is reached relates to a limit in terms of processing capacity. For example, the operating system of the terminal can regularly consult a table of the processes currently executing on the terminal so as evaluate the available calculation time. When the available calculation time reaches a predetermined limit, for example, when the main processing unit of the terminal reaches a rate of use of 95%, the operating system can send a notification indicating that a calculation resource limit is reached.

According to a particular embodiment, the indication according to which a limit of resources is reached relates to a limit in terms of available memory. For example, the operating system of the terminal can regularly consult an occupancy table of the RAM memory so as evaluate the quantity of memory available. When the quantity of memory available reaches a predetermined threshold, for example when the central memory is 90% occupied, the operating system can send a notification indicating that a memory limit is reached.

According to a particular embodiment, the limit of resources pertains to a limit relating to the data transmission capacities on the network. For example, an indication according to which a bandwidth limit is reached can be obtained. Accordingly, the method can consult transmission reports subsequent to the dispatching of the audiovisual data to a remote terminal. Such reports are for example provided by a communication protocol such as RTCP (Real-Time Transport Control Protocol). The analysis of these reports thus provides information about possible congestion in the transport network and allow the method to obtain an indication according to which a bandwidth limit is reached.

During a step 202, the acquisition devices currently in use are identified. For example, the terminal determines whether the camera 102 is active, or whether the camera 103 is active, or else whether both cameras are simultaneously active. Likewise, when the terminal comprises a plurality of audio capture devices, the devices currently in use are identified. Accordingly, the terminal may for example use programming interfaces of its operating system to list initially the capture devices available on the terminal and then, for each of the devices of this list, to interrogate the operating system so as to determine whether or not they are active.

According to a particular embodiment, an item of information regarding priority is associated with the various acquisition devices. This item of information makes it possible to class the acquisition devices according to their importance in the communication. For example, a user's speech generally being essential in a communication, the priority of the audio acquisition device 105 of FIG. 1 may be greater than that of the ambient sound capture device 103. Thus, a priority of first rank may be assigned to the device 105 and a priority of lower rank may be assigned to the acquisition device 103. The classing of the acquisition devices according to their priority may be stored in the form of a configuration file held in a persistent memory of the terminal, or in a database of the terminal, and for example advised beforehand by the user. According to a particular embodiment, the configuration is stored on a server accessible via a communication network.

According to a particular embodiment, the priority of an acquisition device is determined by where the device is located on the terminal. Indeed, the face on which an acquisition device is positioned makes it possible to determine a context of use and the importance to the user of the captured stream. For example, a camera situated on the rear face of the terminal, such as the camera 103, is associated with a higher priority than that of the camera 102, situated on the front face. Indeed, it is possible to determine a probable context of use of the terminal according to the position of an acquisition device currently in use. For example, when in the course of a communication the acquisition devices 102 and 105 are implemented, the image of the user's face and their voice are captured so as to be transmitted to an opposite party. On the other hand, when the acquisition devices 103 and 104 are implemented, it is because the user wishes deliberately to share a particular object. Thus, since it results from a deliberate choice of the user, a video stream captured with the help of the camera 103 has greater importance than a stream captured by the camera 102. Likewise, it may be considered that the sound captured by the microphone 105 which is intended to capture the user's speech is more important than an audio stream captured by the ambience microphone 104 intended for its part to capture a sound ambience.

In step 203, a resources-saving measure is implemented when a particular device is determined as currently in use. For example, when the video acquisition device 102 is determined as currently in use, at least one resources-saving measure associated with the stream captured by this device is implemented whilst, conversely, when the video acquisition device 103 is determined as currently in use, no resources-saving measure associated with the video stream captured by this device is implemented. Likewise, when the audio acquisition device 104 is determined as currently in use, at least one resources-saving measure associated with the stream captured by this device is implemented, whilst, conversely, when the audio acquisition device 105 is determined as currently in use, no resources-saving measure associated with the video stream captured by this device is implemented. Thus, the video stream is favoured when it arises from the dorsal camera of the terminal and the audio stream is favoured when it originates from the microphone intended to capture the user's speech. Thus, the method makes it possible to implement resources-saving measures according to the context of use of the terminal. In particular, the method allows the safeguarding of a stream which is important to the user and the application of resources-saving measures when the stream is less important to the user.

Thus, according to a particular embodiment, the method does not apply any resources-saving measure when a video stream is captured by a camera which is not situated on the front face of the terminal and applies at least one saving measure to a video stream when it arises from a camera situated on the front face of the terminal, that is to say on the same face as the main screen of the terminal.

According to a particular embodiment, the method does not apply any resources-saving measure when an audio stream is captured by a microphone intended to capture the user's speech, such as for example the microphone 105, and applies at least one saving measure when the audio stream arises from a microphone intended to capture the sound ambience of the environment of the terminal, such as for example the microphone 104.

According to a first example, when the camera 102 is determined as currently in use and when an indication according to which a resource limit is reached, the method implements a resources-saving measure associated with this device. According to a first example, the saving measure consists in suspending capture by the device identified as currently in use. Accordingly, the stopping of the capture device may for example be carried out by means of a procedure call via a programming interface of the operating system. Such a measure can also be implemented when the stream transmitted to the opposite party is a stream composed from images captured simultaneously with the help of the camera 102 and of the camera 103. For example, when the terminal transmits images of the environment that are captured via the camera 103, the said images being inlaid with images of the user's face captured via the camera 102, the saving measure consists in halting the capture and the inlaying of the images of the user's face. Thus, the disclosed embodiment makes it possible to reduce the complexity of the processing while allowing the user to continue sharing the object filmed by the camera 103.

According to another example, the resources-saving measure consists in suspending the capture with the help of a device determined as currently in operation and in repeating the last captured image. Accordingly, the terminal can store in a RAM memory the last image captured and provide this image to the video encoder instead of the images captured by the camera 102. Encoding a static image makes it possible to considerably reduce the bitrate of the compressed stream resulting from the coding and allows a saving to be made in terms of network bandwidth. Such a measure can also be implemented when the stream transmitted to the opposite party is a stream composed from images captured simultaneously with the help of the camera 102 and of the camera 103. In this case, the capture of the images by the device 103 is continued whilst the images captured by the camera 102 are replaced with the last captured image.

According to a particular embodiment, the method is such that the resources-saving measure comprises the reducing of the frequency of capture of the images by the first device.

According to a particular embodiment, the method is such that the energy-saving measure comprises the reducing of the spatial resolution of the images captured by the first device.

Reducing the capture frequency or the resolution of the captured images allows a significant reduction in the coding complexity and allows substantial savings to be made in terms of consumption of energy and bandwidth. Such measures can be implemented by modifying the configuration of the acquisition devices, for example through programming interfaces of the operating system.

According to a particular embodiment, when an audio stream transmitted to an opposite party results from a mixing of the sound captured by the microphone 104 and the microphone 105, a resources-saving measure consists in halting the capture with the help of the microphone 104 while continuing the capture with the help of the device 105. The user's speech generally being more important than the sound ambience of the terminal, the method thus makes it possible to implement a saving measure suited to the context of use of the terminal.

Figure 3:
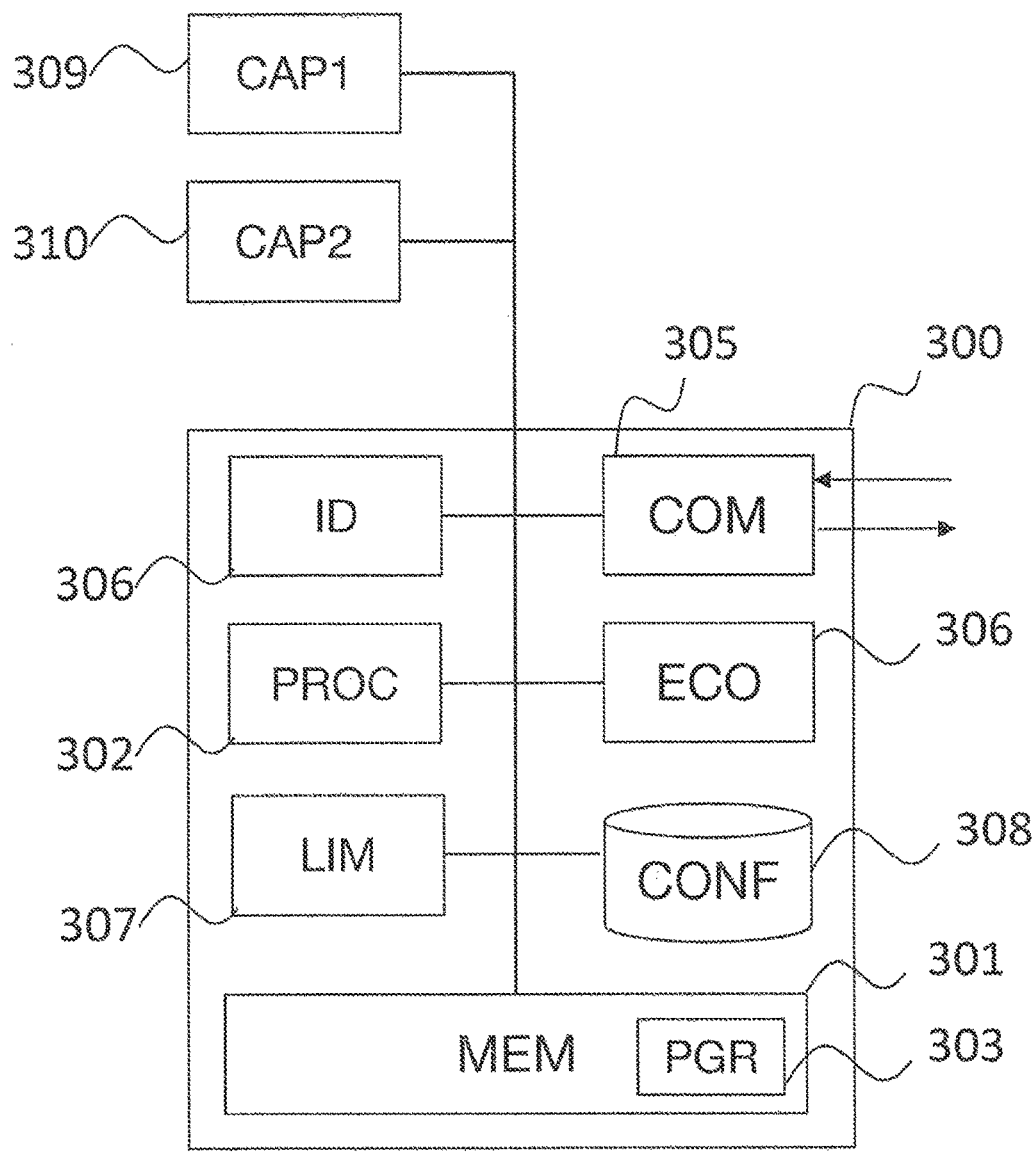
FIG. 3 illustrates the architecture of a device suitable for implementing the disclosed methods according to a particular embodiment.

FIG. 3 illustrates the architecture of a device 300 suitable for implementing the method according to a particular embodiment.

The device comprises a storage space 301, for example a memory MEM, a processing unit 302 equipped for example with a processor PROC. The processing unit can be driven by a program 303, for example a computer program PGR, implementing the management method such as described herein with reference to FIG. 3, and especially the steps of obtaining of an indication according to which a limit of resources is reached, of identification of the acquisition devices currently in use, and of implementation of a resources-saving measure when the first device is identified as currently in use.

On initialization, the instructions of the computer program 303 are for example loaded into a RAM (Random Access Memory) memory before being executed by the processor of the processing unit 302. The processor of the processing unit 302 implements the steps of the management method according to the instructions of the computer program 303.

Accordingly, the device comprises, in addition to the memory 301, at least one first (309) and one second (310) acquisition devices suitable for capturing data of one and the same type. This may entail for example a first and a second camera, the first camera being suitable for capturing images of the user and the second camera being suitable for capturing images of the environment of the terminal. According to a particular embodiment, these acquisition devices are located on different faces of the terminal, the first camera being positioned on the same face as the screen of the terminal and the second camera being positioned on the opposite face. According to a particular embodiment, the first and second acquisition devices are audio acquisition devices, the first device being configured to capture an ambient sound of the environment of the terminal, the second device being configured to capture the user's speech.

According to yet another particular embodiment, the terminal comprises first and second video capture devices and first and second audio capture devices.

The device also comprises a communication module 305 allowing the device to exchange data with other terminals, and in particular to transmit audio and/or video streams captured with the help of acquisition devices of the terminal. This communication module can correspond for example to a network interface of Wifi, Bluetooth, GSM, 3G or Ethernet type and makes it possible to establish data connections and/or voice communications.

The device also comprises a module 307 for obtaining an indication according to which a limit of resources is reached. The module 307 can be implemented by a processor, for example by the processor PROC of the processing unit 304 and by executing computer program instructions, for example loaded into the memory 301. The instructions for the implementation of the module 307 can comprise instructions configured to subscribe to notifications sent by the operating system of the terminal and instructions for receiving these notifications, and notifications in particular relating to the reaching of thresholds of residual charge of a battery, of thresholds of memory occupancy or of CPU (Central Processing Unit) load. The instructions for the implementation of the module 307 can also comprise instructions suitable for receiving and analysing data transmission reports, such as for example RTCP reports, so as to determine whether an occupancy threshold of the transmission network is reached.

The device also comprises a module 306 for identifying the acquisition devices currently in use. Such a module can be implemented by a processor, for example by the processor PROC of the processing unit 304 and by executing computer program instructions loaded into the memory 301 and suitable for identifying at least one acquisition device, by invoking for example functions of a programming interface of the operating system of the device. Accordingly, the device can obtain a list of the acquisition devices of the terminal and for each element of the list, invoke a function making it possible to obtain a status regarding the activity of the acquisition device.

The device furthermore comprises, optionally, a module 308 for reading a configuration item of information comprising at least one association between an acquisition device and a priority. This module 308 may be for example a module for accessing a database of the terminal or a module for reading a configuration file, or, according to a particular embodiment, with the help of a remote server.

Finally, the device comprises a control module 306 configured to implement a resources-saving measure when the first device is identified as currently in use. The module 306 can be implemented by a processor, for example by the processor PROC of the processing unit 304 and by executing computer program instructions loaded into the memory 301 and suitable for implementing, when at least one particular acquisition device is determined as currently in use, at least one resource-saving measure associated with this at least one particular acquisition device. According to a particular embodiment, the resources-saving measure associated with an acquisition device is implemented when at least two acquisition devices are identified as currently in use. Accordingly, the instructions suitable for implementing the module 306 can comprise at least one instruction suitable for suspending the capture of the data with the help of the at least one acquisition device determined as being currently in the course of acquisition. According to a particular embodiment, the instructions for implementing the module 306 comprise instructions aimed at storing in a memory, for example in the memory 301, the last image captured by a video acquisition device determined as currently in use and at regularly providing an encoder with this last image captured so that it is transmitted to an opposite party. According to another particular embodiment, the instructions for implementing the module 306 comprise instructions suitable for reconfiguring at least one video acquisition device in such a way as to reduce the spatial resolution or the frequency of the captured images.

According to a particular embodiment, the device is integrated into a communication terminal of smartphone, tablet, portable video games console type or else into a personal computer.

The invention claimed is:

1. A method for managing resources during the capture of at least one data stream on a terminal, the terminal comprising at least one first acquisition device located on a front face of the terminal for acquiring a data stream and a second acquisition device located on a rear face of the terminal, the first and second acquisition devices being configured to capture the same type of data, the method comprising:
   upon obtaining an indication according to which a limit of resources of the terminal is reached implementing a resources-saving measure associated with the first acquisition device when the first and second acquisition devices are identified as currently in use.

2. The method according to claim 1, wherein the resources-saving measure comprises the suspension of capture by the first device.

3. The method according to claim 1, wherein the data stream is a video stream.

4. The method according to claim 3, wherein the resources-saving measure comprises the repeating of the last image captured by the first acquisition device.

5. The method according to claim 3, wherein the resources-saving measure comprises the reducing of the frequency of capture of the images by the first acquisition device.

6. The method according to claim 3, wherein the energy-saving measure comprises the reducing of the spatial resolution of the images captured by the first acquisition device.

7. The method according to claim 1, wherein the data stream is an audio stream.

8. A device for managing resources during the capture of at least one data stream, the device comprising at least one first acquisition device located on a front face of the terminal for acquiring a data stream and a second acquisition device located on a rear face of the terminal, the first and second acquisition devices being configured to capture the same type of data, the device configured to:
   upon obtaining an indication according to which a limit of resources of the terminal is reached, implement a resources-saving measure associated with the first acquisition device when the first and second acquisition devices are identified as currently in use.

9. The device according to claim 8, wherein the first and second acquisition devices are located on different faces of the device.

10. A communication terminal comprising the device according to claim 8.

11. A non-transitory computer-readable information storage medium readable by a processor and having stored thereon instructions which, when executed by the processor, cause the processor to perform a method for managing resources during the capture of at least one data stream on a terminal, the terminal comprising at least one first acquisition device located on a front face of the terminal for acquiring a data stream and a second acquisition device located on a rear face of the terminal, the first and second acquisition devices being configured to capture the same type of data, the method comprising:

upon obtaining an indication according to which a limit of resources of the terminal is reached implementing a resources-saving measure associated with the first acquisition device when the first and second acquisition devices are identified as currently in use.

* * * * *